US010281206B2

(12) United States Patent
Kong et al.

(10) Patent No.: US 10,281,206 B2
(45) Date of Patent: *May 7, 2019

(54) APPARATUS FOR THE PRODUCTION OF AIR GASES BY THE CRYOGENIC SEPARATION OF AIR WITH VARIABLE LIQUID PRODUCTION AND POWER USAGE

(71) Applicant: L'Air Liquide, Societe Anonyme pour l'Etude et l'Exploitation des Procedes Georges Claude, Paris (FR)

(72) Inventors: Paul Kong, Sugar Land, TX (US); Minh Pham-Huy, Houston, TX (US); Wendy Yip, Sugar Land, TX (US)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/637,035

(22) Filed: Jun. 29, 2017

(65) Prior Publication Data
US 2018/0003432 A1 Jan. 4, 2018

Related U.S. Application Data

(60) Provisional application No. 62/356,955, filed on Jun. 30, 2016.

(51) Int. Cl.
*F25J 3/04* (2006.01)
*F25J 3/02* (2006.01)
(Continued)

(52) U.S. Cl.
CPC ............ *F25J 3/0257* (2013.01); *B01D 3/146* (2013.01); *B01D 3/322* (2013.01); *B01D 3/42* (2013.01);
(Continued)

(58) Field of Classification Search
CPC .. F25J 3/04412; F25J 3/04024; F25J 3/04163; F25J 3/04848; F25J 3/04018;
(Continued)

(56) References Cited

U.S. PATENT DOCUMENTS

2002/0103548 A1* 8/2002 Treiber ................ G05B 13/042
700/30
2003/0213688 A1* 11/2003 Wang ................... B01D 3/4227
203/1
(Continued)

*Primary Examiner* — Brian M King
(74) *Attorney, Agent, or Firm* — Justin K. Murray

(57) ABSTRACT

An apparatus for the production of air gases by the cryogenic separation of air can include a cold box having a heat exchanger, and a system of columns; a pressure monitoring device; and a controller. The cold box can be configured to receive a purified and compressed air stream under conditions effective for cryogenically separating the air stream to form an air gas product. The apparatus may also include means for transferring the air gas product from the cold box to an air gas pipeline. The pressure monitoring device is configured to monitor the pipeline pressure, and the controller is configured to determine whether to operate in a power savings mode or a variable liquid production mode. By operating the apparatus in a dynamic fashion, a power savings and/or additional high value cryogenic liquids can be realized in instances in which the pipeline pressure deviates from its highest value.

13 Claims, 6 Drawing Sheets

(51) Int. Cl.
  *C01B 21/04* (2006.01)
  *B01D 3/32* (2006.01)
  *B01D 3/14* (2006.01)
  *B01D 3/42* (2006.01)
  *F15C 3/00* (2006.01)
  *F15B 11/042* (2006.01)
  *F15C 1/00* (2006.01)
  *B01D 5/00* (2006.01)
  *F28B 1/00* (2006.01)
  *B01J 4/00* (2006.01)

(52) U.S. Cl.
  CPC ......... *C01B 21/0433* (2013.01); *F25J 3/0409* (2013.01); *F25J 3/04084* (2013.01); *F25J 3/04296* (2013.01); *F25J 3/04412* (2013.01); *F25J 3/04527* (2013.01); *F25J 3/04836* (2013.01); *B01D 5/0051* (2013.01); *B01J 4/008* (2013.01); *F15B 11/0423* (2013.01); *F15C 1/002* (2013.01); *F15C 3/00* (2013.01); *F25J 2290/60* (2013.01); *F28B 1/00* (2013.01)

(58) Field of Classification Search
  CPC .. F25J 2220/40; F25J 2215/50; F25J 2215/42; F25J 2210/40; F25J 2290/12; F25J 3/04781
  See application file for complete search history.

(56) References Cited

U.S. PATENT DOCUMENTS

| | | | |
|---|---|---|---|
| 2008/0047298 A1* | 2/2008 | Corduan | F25J 3/0409 62/643 |
| 2016/0003536 A1* | 1/2016 | Goloubev | F25J 3/04957 62/652 |
| 2017/0131029 A1* | 5/2017 | Sarigiannis | F25J 3/04412 |

* cited by examiner

APPARATUS FOR THE PRODUCTION OF AIR GASES BY THE CRYOGENIC SEPARATION OF AIR WITH VARIABLE LIQUID PRODUCTION AND POWER USAGE

RELATED APPLICATIONS

This application claims priority to U.S. Provisional Application Ser. No. 62/356,955 filed on Jun. 30, 2016, which is hereby incorporated by reference in its entirety.

TECHNICAL FIELD OF THE INVENTION

The present invention generally relates to a method and apparatus for efficiently operating an air separation plant that feeds at least one of its products to an external pipeline.

BACKGROUND OF THE INVENTION

Air separation plants separate atmospheric air into its primary constituents: nitrogen and oxygen, and occasionally argon, xenon and krypton. These gases are sometimes referred to as air gases.

A typical cryogenic air separation process can include the following steps: (1) filtering the air in order to remove large particulates that might damage the main air compressor; (2) compressing the pre-filtered air in the main air compressor and using interstage cooling to condense some of the water out of the compressed air; (3) passing the compressed air stream through a front-end-purification unit to remove residual water and carbon dioxide; (4) cooling the purified air in a heat exchanger by indirect heat exchange against process streams from the cryogenic distillation column; (5) expanding at least a portion of the cold air to provide refrigeration for the system; (6) introducing the cold air into the distillation column for rectification therein; (7) collecting nitrogen from the top of the column (typically as a gas) and collecting oxygen from the bottom of the column as a liquid.

In certain cases, the air separation unit ("ASU") can be used to supply one of its air gases to a nearby pipeline (e.g., an oxygen or nitrogen pipeline) in order to supply one or more customers that are not located immediately near the ASU. In a typical ASU supplying a local pipeline, it is common to use a process configuration utilizing an internal compression (pumping) cycle, which in the case of an oxygen pipeline, means that the liquid oxygen produced from the lower pressure column is pumped from low pressure to a higher pressure than that of the pipeline and vaporized within the heat exchanger, most commonly against a high pressure air stream coming from a booster air compressor ("BAC") or from the main air compressor ("MAC"). As used herein, a booster air compressor is a secondary air compressor that is located downstream of the purification unit that is used to boost a portion of the main air feed for purposes of efficiently vaporizing the product liquid oxygen stream.

Under normal conditions, the ASU feeding oxygen to the oxygen pipeline is designed to produce oxygen at a constant pressure. This is because ASUs operate most efficiently at steady state conditions. However, pipelines do not operate at constant pressures. For example, it is not uncommon for an oxygen pipeline to operate between 400 and 600 psig (i.e., about a 200 psig pressure variance) during a single day. This can occur due to variable customer demand, variable supply to the pipeline, and/or variable pipeline hydraulics.

In the prior art known heretofore, it is customary to design the ASU to provide the oxygen gas at a constant pressure that is above the highest pressures expected for the pipeline. In order to address the problem associated with pipeline pressure variance, it is customary to let down the pressure of the gaseous oxygen across a control valve to approximately match the pressure of the pipeline just prior to introducing the oxygen gas to the pipeline. However, this method suffers from inefficiencies anytime the pipeline pressure is below that of the design pressure of the ASU. Therefore, it would be advantageous to provide a method and apparatus that operated in a more efficient manner.

SUMMARY OF THE INVENTION

The present invention is directed to a method and apparatus that satisfies at least one of these needs.

In one embodiment, the invention can include a method for adjusting the production pressure(s) of the air gases (e.g., nitrogen and oxygen) to follow the pressure of the pipeline, thereby reducing power consumption and/or increase liquid production when the pipeline pressure decreases.

In one embodiment, this inefficiency can be minimized by designing the equipments used in the ASU (e.g., main heat exchanger, liquid oxygen ("LOX") pump, BAC, MAC, etc. . . . ) to have sufficient flexibility for being able to deliver gaseous oxygen ("GOX") at different pressure levels based on the pipeline pressure. In another embodiment, the method and apparatus can include a process control strategy to automatically and continuously adjust the GOX product pressure coming out of the main heat exchanger to follow the pipeline pressure.

In another embodiment, as the GOX product pressure can be adjusted to match the oxygen pipeline, the discharge pressure of the BAC can be adjusted to match the heating curve of the pressurized LOX. Those skilled in the art will also recognize that if the unit does not use a BAC, then the discharge pressure of the MAC can be adjusted in a similar fashion.

In one particular embodiment, the apparatus can include an automatic pipeline GOX feed valve that is set at 100% open, with the GOX flow being controlled by a flow indicator controller ("FIC") that is operable to effect a change with the LOX pump speed. The discharge pressure of the BAC can be based on actual ASU GOX pressure through a control loop, preferably a feed forward control loop. As the pipeline pressure decreases, the discharge pressure of the BAC, as well as the LOX pump, will reduce, thereby providing significant power savings.

Additionally, the stability of the overall ASU process does not suffer due to these dynamic process conditions. This is largely due to ASU having faster dynamics than the pipeline, since the pipeline often contains such large volumes of gas; the pressure variation is, relatively speaking, slow.

In other embodiments, the pipeline can be a nitrogen pipeline that is fed by high pressure gaseous nitrogen ("GAN") that is produced by internal compression process. The control strategy can also be implemented using any alternative control scheme that can allow GOX and/or GAN pressure to automatically follow the pipeline. For example, the ASU product pressure can be adjusted to follow the pipeline by controlling the pressure differential across the product control valve to the pipeline. In one embodiment, the pressure differential across the product control valve is less than 5 psi. In another embodiment, the ASU product pressure is within 5 psi of the pipeline pressure, thereby allowing the product control valve to remain fully open, resulting in a minimal pressure loss across the product control valve.

In another embodiment, the method can further overcome the inefficiency by varying liquid production levels based on variations of the pipeline pressure. In certain embodiments of the invention, this inefficiency is eliminated by designing the equipments including main exchanger, LOX Pump, MAC, and BAC, etc. with sufficient flexibility of being able to deliver GOX at different pressure levels according to the pipeline pressure and by implementing a process control strategy to automatically and continuously adjust the GOX product pressure to follow the pipeline pressure. In this particular implementation, the automatic pipeline GOX feed valve can be set at 100% open and GOX flow can be controlled by a flow indicator controller ("FIC") manipulating the LOX pump speed. The lower the GOX pipeline at the delivering point, the lower the GOX pressure from the cold box.

One efficiency gain that can be realized by lowering the GOX product pressure coming from the cold box is to increase the production of liquid product, either liquid oxygen ("LOX") and/or liquid nitrogen ("LIN") without changing the set point of the operating conditions of the MAC or the BAC. Additional liquid production is realized by a decrease in refrigeration losses. For example, by running the LOX pump at a reduced pressure, the LOX pump will produce less heat input to the process. Additionally, a lowered pressure for the LOX results in less refrigeration losses from free compression. Thirdly, the lower pressure LOX going through the heat exchanger results in a smaller warm end temperature differential loss within the heat exchanger, which results in a gain of additional cold recovery. All three of these factors help to contribute to additional available refrigeration, thereby allowing for an increased liquid production (e.g., liquid nitrogen and/or liquid oxygen). Notably, this increased refrigeration does not require any additional compression or expansion steps, and therefore, the additional liquid production is accomplished without the typical increase in power usage.

For example, a 1500 st/d $O_2$ ASU producing GOX at 600 psig can produce about 4150 scfh additional liquid nitrogen when the oxygen product from the liquid oxygen pump is reduced to 450 psig. The overall stability of an ASU process will not be compromised by this pressure variation due to the fact that ASU process usually has faster dynamics than the pipeline and the pipeline often intrinsically contains a large buffer and pressure variation can only occur slowly.

Although certain embodiments of the invention have only been described for a GOX product sent to an oxygen pipeline, the concept can easily be applied to any product such as high pressure gaseous nitrogen (GAN) that is produced by internal compression process. The control strategy can easily be implemented using any alternative control scheme that can allow GOX and/or GAN pressure to automatically follow the pipeline. For example, the ASU product pressure can be adjusted to follow the pipeline by controlling the pressure differential across the product control valve to the pipeline. For example, instead of directly measuring the pressure of the gaseous product coming from the cold box, the user can measure the pressure drop across the product control valve, and use the control means to derive a desired set point for the pressure drop across the control valve by adjusting the pressure of the gas coming out of the cold box (e.g., if GOX is the product stream, the liquid oxygen pump could be adjusted until the pressure drop across the product control valve is at or below a desired threshold).

In one embodiment, the pressure differential across the product control valve is less than 5 psi, more preferably less than 3 psi, more preferably less than 1 psi. In another embodiment, the ASU product pressure is within 5 psi of the pipeline pressure, thereby allowing the product control valve to remain fully open, resulting in a minimal pressure loss across the product control valve. In another embodiment, the pressure differential across the product control valve is less than 2%, preferably 1%, more preferably 0.5% of the pipeline pressure. Ideally, the pressure drop across the product control valve approaches zero In one embodiment, a method for the production of air gases by the cryogenic separation of air with variable liquid production and power consumption can include the steps of:

a) compressing air to a pressure suitable for the cryogenic rectification of air to produce a compressed humid air stream, the compressed humid air stream having a first pressure $P_o$;

b) purifying the compressed humid air stream of water and carbon dioxide within a front end purification system to produce a dry air stream having reduced amounts of water and carbon dioxide as compared to the compressed humid air stream;

c) compressing a first portion of the dry air stream in a booster compressor to form a boosted air stream, the boosted air stream having a first boosted pressure $P_{B1}$;

d) introducing a second portion of the dry air stream and the boosted air stream to a cold box under conditions effective to separate air to form an air gas product, wherein the air gas product is selected from the group consisting of oxygen, nitrogen, and combinations thereof;

e) withdrawing the air gas product from the cold box, the air gas product having a first product pressure $P_{P1}$;

f) introducing the air gas product to a pipeline, wherein the pipeline is configured to transport the air gas product to a location located downstream of the pipeline, wherein the pipeline operates at a pipeline pressure $P_{PL}$, wherein the air gas product is introduced to the pipeline at a first delivery pressure $P_{D1}$;

g) monitoring the pipeline pressure $P_{PL}$ within the pipeline; and h) determining a mode of operation to operate using the pipeline pressure $P_{PL}$ of step g), wherein the mode of operation is selected from the group consisting of variable power usage, variable liquid production, and combinations thereof, wherein during periods of time in which the mode of operation is variable power usage, the method further comprises the step of:

i) adjusting one or more pressure set points within the cold box based on the pipeline pressure $P_{PL}$, wherein during periods of time in which the mode of operation is variable liquid production, the method further comprises the step of:

j) adjusting one or more pressure set points within the cold box based on the pipeline pressure $P_{PL}$; and k) adjusting liquid production from the cold box based on the one or more pressure set points adjusted in step j).

In optional embodiments of the method for the production of air gases by the cryogenic separation of air:

the step of determining the mode of operation further comprises providing a process controller configured to access process conditions selected from the group consisting of spot pricing data for electricity, local liquid inventories, and combinations thereof;

the one or more pressure set points of steps i) and j) is the first product pressure $P_{P1}$;

during periods of time in which the mode of operation is variable liquid production, the first boosted pressure $P_{B1}$ is kept substantially constant during steps j) and k);

during periods of time in which the mode of operation is variable power usage, the first boosted pressure $P_{B1}$ is adjusted such that the difference between the first delivery pressure $P_{D1}$ and the pipeline pressure $P_{PL}$ is below a given threshold;

the threshold is less than 5 psi, preferably less than 3 psi;

the cold box comprises a main heat exchanger, a system of columns having a double column composed of a lower pressure column and a higher pressure column, a condenser disposed at a bottom portion of the lower pressure column, and a liquid oxygen pump;

the air gas product is oxygen and the pipeline is an oxygen pipeline;

the liquid oxygen pump pressurizes liquid oxygen from the lower pressure column to the first product pressure $P_{P1}$;

the first product pressure $P_{P1}$ is adjusted based upon the monitored pipeline pressure $P_{PL}$;

the first boosted pressure $P_{B1}$ is adjusted based upon the first product pressure $P_{P1}$; and/or the air gas product is nitrogen and the pipeline is a nitrogen pipeline.

In another aspect of the invention, a method for the production of air gases by the cryogenic separation of air can include a first mode of operation and a second mode of operation, wherein during the first mode of operation and the second mode of operation, the method comprises the steps of: sending a purified and compressed air stream to a cold box under conditions effective for cryogenically separating the air stream to form an air gas product using a system of columns, wherein the purified and compressed air stream is at a feed pressure $P_F$ when entering the cold box, wherein the air gas product is selected from the group consisting of oxygen, nitrogen, and combinations thereof; withdrawing the air gas product at a product pressure $P_{PO}$; delivering the air gas product at a delivery pressure $P_{DO}$ to an air gas pipeline, wherein the air gas pipeline has a pipeline pressure $P_{PL}$; monitoring the pipeline pressure $P_{PL}$; wherein during the second mode of operation, the method further comprises the steps of: reducing the difference between the pipeline pressure $P_{PL}$ and the delivery pressure $P_{DO}$; and adjusting liquid production from the cold box.

In optional embodiments of the method for the production of air gases by the cryogenic separation of air:

the step of reducing difference between the pipeline pressure $P_{PL}$ and the delivery pressure $P_{DO}$ further comprises adjusting the product pressure $P_{PO}$;

the step of reducing difference between the pipeline pressure $P_{PL}$ and the delivery pressure $P_{DO}$ further comprises the step of adjusting the feed pressure $P_F$;

the step of adjusting liquid production from the cold box further comprises the step of maintaining the feed pressure $P_F$ substantially constant;

the product pressure $P_{PO}$ and the delivery pressure $P_{DO}$ are substantially the same;

the air gas product is oxygen, wherein the cold box comprises a main heat exchanger, a system of columns having a double column composed of a lower pressure column and a higher pressure column, a condenser disposed at a bottom portion of the lower pressure column, and a liquid oxygen pump;

the cold box further comprises a gaseous oxygen (GOX) feed valve, wherein the GOX feed valve is in fluid communication with an outlet of the liquid oxygen pump and an inlet of the air gas pipeline;

the step of reducing the difference between the pipeline pressure $P_{PL}$ and the delivery pressure $P_{DO}$ comprises an absence of adjusting the GOX feed valve;

the step of reducing the difference between the pipeline pressure $P_{PL}$ and the delivery pressure $P_{DO}$ includes maintaining the GOX feed valve fully open;

the method may also include, during both modes of operation, the step of providing a main air compressor upstream the cold box, wherein during the first mode of operation, the step of reducing the difference between the pipeline pressure $P_{PL}$ and the delivery pressure $P_{DO}$ further comprises the step of adjusting the operation of the liquid oxygen pump and the operation of the main air compressor, such that the product pressure $P_{PO}$ and the feed pressure $P_F$ are adjusted, and wherein during the second mode of operation, the step of reducing the difference between the pipeline pressure $P_{PL}$ and the delivery pressure $P_{DO}$ further comprises the step of adjusting the operation of the liquid oxygen pump while maintaining the operation of the main air compressor substantially constant, such that the product pressure $P_{PO}$ is adjusted while keeping the feed pressure $P_F$ substantially constant; and/or the method may also include, during both modes of operation, the step of providing a main air compressor upstream the cold box, wherein during the first mode of operation, the step of reducing difference between the pipeline pressure $P_{PL}$ and the delivery pressure $P_{DO}$ further comprises the step of adjusting the operation of the liquid oxygen pump and the operation of the booster compressor, such that the product pressure $P_{PO}$ and the feed pressure $P_F$ are adjusted, and wherein during the second mode of operation, the step of reducing the difference between the pipeline pressure $P_{PL}$ and the delivery pressure $P_{DO}$ further comprises the step of adjusting the operation of the liquid oxygen pump while maintaining the operation of the booster compressor substantially constant, such that the product pressure $P_{PO}$ is adjusted while keeping the feed pressure $P_F$ substantially constant.

In another aspect of the invention, an apparatus is provided. In this embodiment, the apparatus may include:

a) a main air compressor configured to compress air to a pressure suitable for the cryogenic rectification of air to produce a compressed humid air stream, the compressed humid air stream having a first pressure $P_o$;

b) a front end purification system configured to purify the compressed humid air stream of water and carbon dioxide to produce a dry air stream having reduced amounts of water and carbon dioxide as compared to the compressed humid air stream;

c) a booster compressor in fluid communication with the front end purification system, wherein the booster compressor is configured to compress a first portion of the dry air stream to form a boosted air stream, the boosted air stream having a first boosted pressure $P_{B1}$;

d) a cold box comprising a main heat exchanger, a system of columns having a double column composed of a lower pressure column and a higher pressure column, a condenser disposed at a bottom portion of the lower pressure column, and a liquid oxygen pump, wherein the cold box is configured to receive the boosted air stream and a second portion of the dry air stream under conditions effective to separate air to form an air gas product, wherein the air gas product is selected from the group consisting of oxygen, nitrogen, and combinations thereof;

e) means for monitoring the pressure of a pipeline, wherein the pipeline is in fluid communication with the cold box, such that the pipeline is configured to receive the air gas product from the cold box, the air gas product having a first product pressure $P_{P1}$; and f) means for adjusting one or more pressure set points of the apparatus based on the monitored pipeline pressure, wherein the one or more pressure set points of the apparatus is selected from the group consisting of a discharge pressure of the liquid oxygen pump, a discharge pressure of the booster air compressor, a discharge pressure of the main air compressor, and combinations thereof;

g) means for adjusting liquid production from the cold box; and h) a process controller configured to choose between a first mode of operation and a second mode of operation, wherein the first mode of operation results in a power savings, wherein the second mode of operation results in increased liquid production.

In optional embodiments of the apparatus for the production of air gases by the cryogenic separation of air:

the process controller is further configured to access process conditions selected from the group consisting of spot pricing data for electricity, local liquid inventories, and combinations thereof;

during the second mode of operation, the process controller is configured maintain the first boosted pressure $P_{B1}$ substantially constant while adjusting the discharge pressure of the liquid oxygen pump;

during the first mode of operation, the process controller is configured to adjust the first product pressure $P_{P1}$ such that the difference between the first product pressure $P_{P1}$ and the first delivery pressure $P_{D1}$ is below a given threshold;

the threshold is less than 5 psi, preferably less than 3 psi;

the air gas product is oxygen and the pipeline is an oxygen pipeline;

the liquid oxygen pump pressurizes liquid oxygen from the lower pressure column to the first product pressure $P_{P1}$;

the first boosted pressure $P_{B1}$ is adjusted based upon the first product pressure $P_{P1}$;

the air gas product is nitrogen and the pipeline is a nitrogen pipeline; and/or during periods of time in which the mode of operation is variable liquid production, the first boosted pressure $P_{B1}$ is kept substantially constant.

In another aspect of the invention, the apparatus for the production of air gases by the cryogenic separation of air can include a cold box configured to receive a purified and compressed air stream under conditions effective for cryogenically separating the air stream to form an air gas product using a system of columns, wherein the purified and compressed air stream is at a feed pressure $P_F$ when entering the cold box, wherein the air gas product is selected from the group consisting of oxygen, nitrogen, and combinations thereof, wherein the cold box is configured to produce the air gas product at a product pressure $P_{PO}$; means for transferring the air gas product from the cold box to an air gas pipeline; a pressure monitoring device configured to monitor the pipeline pressure $P_{PL}$; and a controller configured to operate the apparatus in a first mode of operation and a second mode of operation, wherein during the first mode of operation, the controller is further configured to reduce the difference between the pipeline pressure $P_{PL}$ and the delivery pressure $P_{DO}$; wherein during the second mode of operation, the controller is further configured to reduce the difference between the pipeline pressure $P_{PL}$ and the delivery pressure $P_{DO}$; and adjust liquid production from the cold box.

In optional embodiments of the apparatus for the production of air gases by the cryogenic separation of air:

the air gas product is oxygen, wherein the cold box comprises a main heat exchanger, a system of columns having a double column composed of a lower pressure column and a higher pressure column, a condenser disposed at a bottom portion of the lower pressure column, and a liquid oxygen pump;

wherein the controller is configured to communicate with the liquid oxygen pump and adjust a discharge pressure of the liquid oxygen pump;

the controller, during the second mode of operation, is configured to adjust the liquid production from the cold box while maintaining the feed pressure $P_F$ substantially constant;

the product pressure $P_{PO}$ and the delivery pressure $P_{DO}$ are substantially the same;

the controller is in communication with the pressure monitoring device;

the apparatus have further include an absence of a GOX feed valve configured to reduce the difference between the pipeline pressure $P_{PL}$ and the delivery pressure $P_{DO}$;

the apparatus have further include a gaseous oxygen (GOX) feed valve, wherein the GOX feed valve is in fluid communication with an outlet of the liquid oxygen pump and an inlet of the air gas pipeline, wherein the GOX feed valve is maintained in a fully open position;

the apparatus have further include a main air compressor disposed upstream the cold box, wherein during the first mode of operation, the controller is further configured to adjust a discharge pressure of the main air compressor; and/or the apparatus have further include a booster compressor downstream a main air compressor and upstream the cold box, wherein during the first mode of operation, the controller is further configured to adjust a discharge pressure of the booster compressor.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

Figure 1:
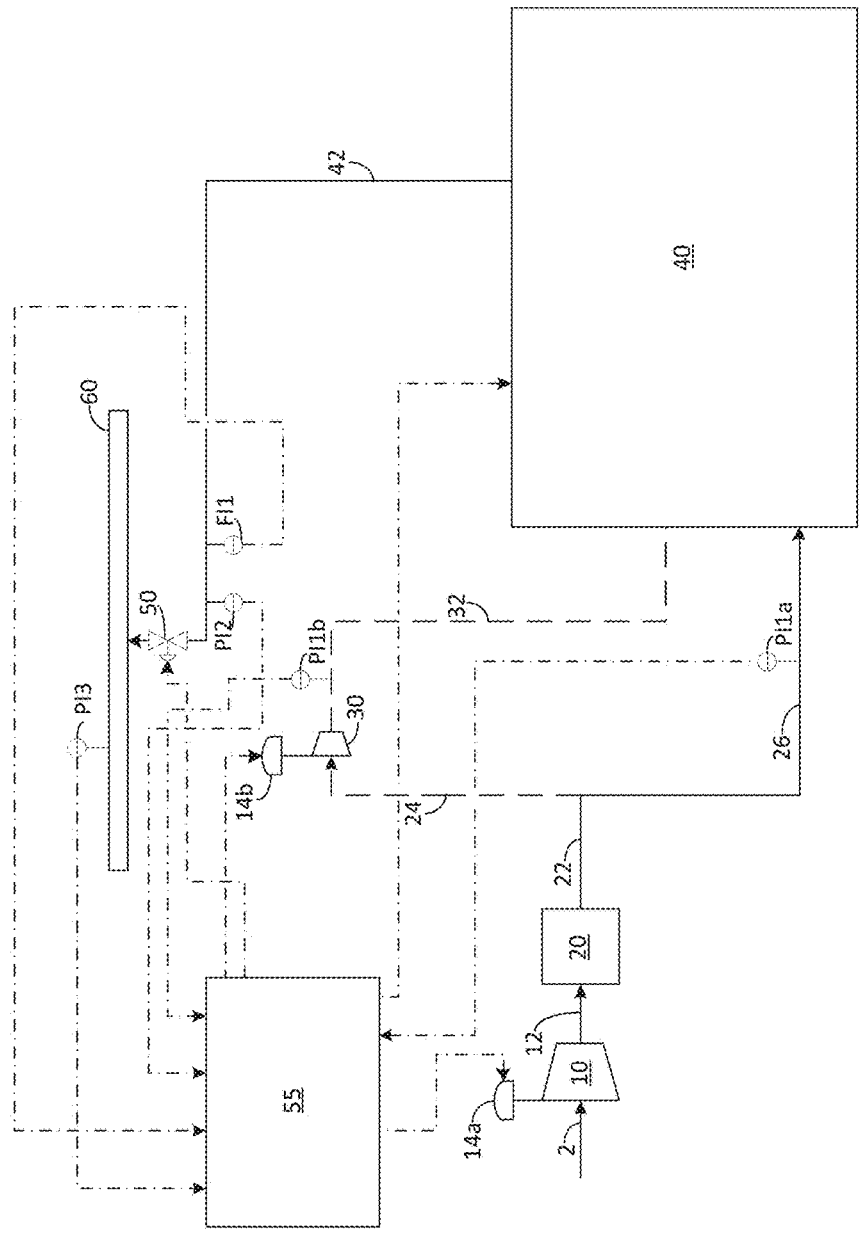
FIG. 1 provides an embodiment of the present invention operating in a variable energy mode.

Now turning to FIG. 1, which represents an embodiment operating in a variable energy mode. Air 2 is introduced into main air compressor 10 and compressed, preferably to a pressure of at least 55 psig to 75 psig (or around 5 psig higher than the pressure of the higher pressure column). In an embodiment without booster air compressor 30, the pressure coming out of MAC 10 is preferably 400-450 psig. The resulting compressed humid air stream 12 is then purified of water and $CO_2$ in front end purification system 20, thereby producing dry air stream 22. In one embodiment, all of dry air stream 22 passes via line 26 into cold box 40. The pressure of dry air stream 22 is measured by first pressure indicator PI1a. Within cold box 40, the air is cooled and cryogenically treated in order to separate the air into air gas product 42. Air gas product 42 is then removed from cold box 40 and passed through product control valve 50 before entering air gas pipeline 60. In a preferred embodiment, the pressure and flow rate of air gas product 42 can be measured by second pressure indicator PI2 and flow indicator FI1, respectively. The pressure of air gas pipeline 60 can be measured by pressure indicator PI3.

In one embodiment, the various pressure and flow indicators/sensors are configured to communicate (e.g., wirelessly or wired communication) with process controller 55, such that the various flow rates and pressures can be monitored by process controller 55, which is configured to adjust various settings throughout the process based on the measured flows and pressures.

Additionally, an embodiment of the present invention may also include booster air compressor 30. This embodiment is represented by dashed lines, since it is an optional embodiment. In this embodiment, a portion of dry air stream 22 is sent to booster air compressor 30 via line 24 and further compressed to form boosted air stream 32 before being introduced to cold box 40. The addition of booster air compressor 30 allows for additional freedoms in fine tuning the process, as will be explained in more detail later. In this embodiment, first pressure indicator PI1b is located on line 32 instead of line 26. Similarly, pressure controller 14b is in communication with booster air compressor 30 as opposed to pressure controller 14a for main air compressor 10. While the embodiment of FIG. 1 shows booster air compressor 30 as a single compressor, those of ordinary skill in the art will recognize that booster air compressor 30 can be more than one physical compressor. Additionally, booster air compressor 30 can also be a multi-stage compressor.

While the figures show direct lines of communication from the various pressure and flow indicators to the process controller 55, embodiments of the invention should not be so limited. Rather, those of ordinary skill in the art will recognize that embodiments of the invention may include instances in which certain indicators communicate directly with a related pressure controller.

Figure 2:
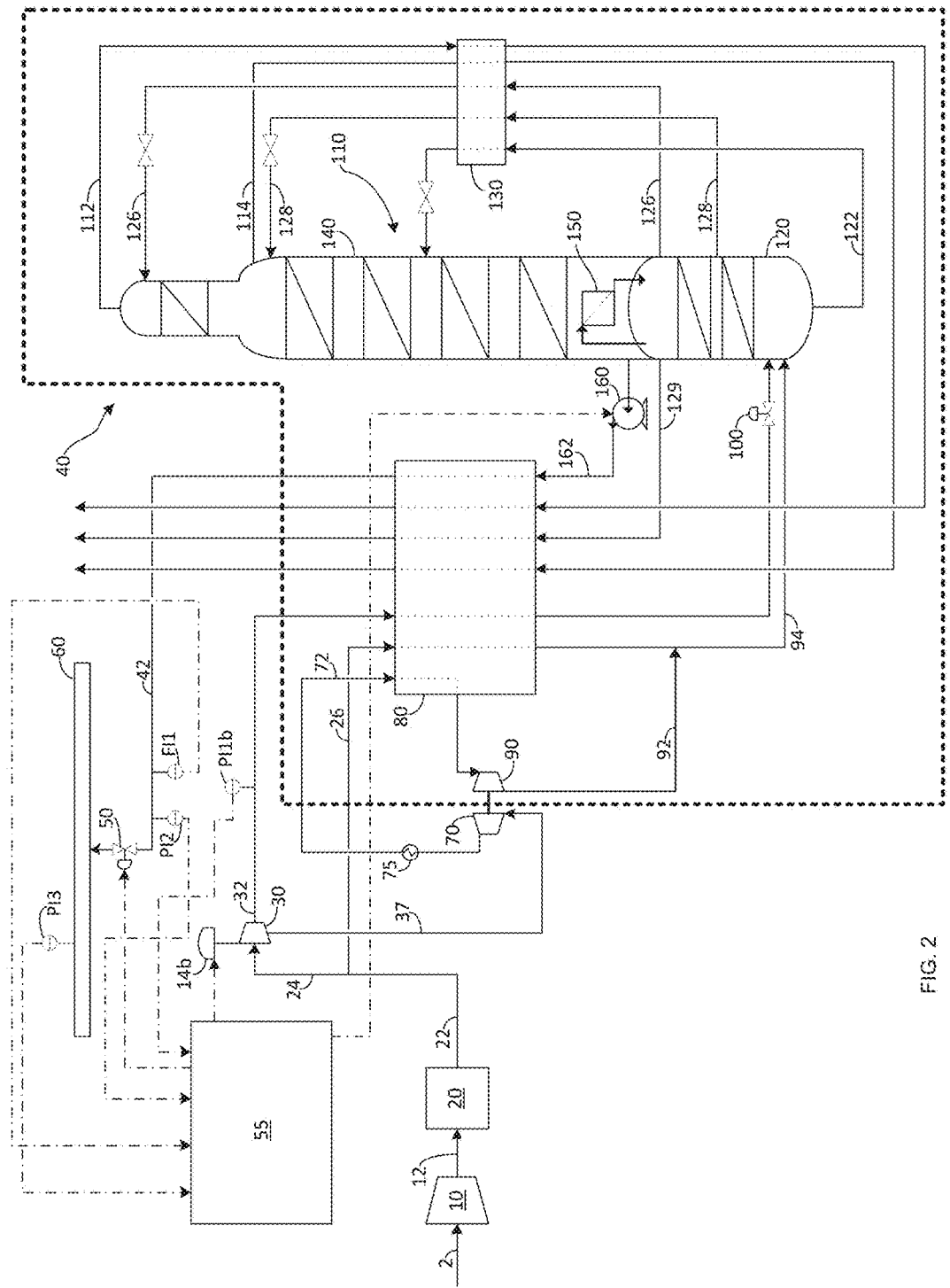
FIG. 2 provides another embodiment of the present invention operating in a variable energy mode.

FIG. 2 provides a more detailed view of cold box 40 for the optional embodiment that includes booster air compressor 30. In this embodiment, cold box 40 also includes heat exchanger 80, turbine 90, valve 100, double column 110, higher pressure column 120, auxiliary heat exchanger 130, lower pressure column 140, condenser/reboiler 150, and liquid oxygen pump 160. Turbine 90 can be attached to booster 70 via a common shaft. Just like in FIG. 1, air 2 is introduced into main air compressor 10 and compressed, preferably to a pressure of at least 55 psig to 75 psig (or around 5 psig higher than the pressure of the higher pressure column). The resulting compressed humid air stream 12 is then purified of water and $CO_2$ in front end purification system 20, thereby producing dry air stream 22. A first portion of dry air stream 24 is sent to booster air compressor 30, with the remaining portion of dry air stream 26 entering cold box 40, wherein it is fully cooled in heat exchanger 80 before being introduced to higher pressure column 120 for separation therein. Following pressurization in booster air compressor 30, boosted air stream 32 is preferably fully cooled in heat exchanger 80 and then expanded across valve 100, before being introduced into a bottom portion of higher pressure column 120.

Partially boosted air stream 37 is preferably removed from an inner stage of booster air compressor 30 before being further compressed in booster 70 and then cooled in after cooler 75 to form second boosted stream 72. Second boosted stream 72 undergoes partial cooling in heat exchanger 80, wherein it is withdrawn from an intermediate section of heat exchanger 80 and then expanded in turbine 90 thereby forming expanded air stream 92, which can then be combined with second portion of dry air stream 26 before introduction to higher pressure column 120.

Higher pressure column 120 is configured to allow for rectification of air within, thereby producing an oxygen-rich liquid at the bottom and a nitrogen-rich gaseous stream at the top. Oxygen-rich liquid 122 is withdrawn from the bottom of higher pressure column 120 before exchanging heat with low pressure waste nitrogen 114 and low pressure nitrogen product 112 in auxiliary heat exchanger 130, and then expanded across a valve and introduced into lower pressure column 140. As is well known in the art, higher pressure column 120 and lower pressure column 140 are part of double column 110, and the two columns are thermally coupled via condenser/reboiler 150, which condenses rising nitrogen rich gas from higher pressure column 120 and vaporizes liquid oxygen that has collected at the bottom of lower pressure column 140. In the embodiment shown, two nitrogen-rich gas streams 126, 128 are withdrawn from higher pressure column 120, exchange heat with low pressure nitrogen product 112 and low pressure waste nitrogen 114, subsequently expanded across their respective valves, and then introduced into lower pressure column 140. Higher pressure nitrogen product 129 can also be withdrawn from higher pressure column 120 and then warmed in heat exchanger 80.

Liquid oxygen collects at the bottom of lower pressure column 140 and is withdrawn and pressurized to an appropriate pressure by liquid oxygen pump 160 to form liquid oxygen product 162. Liquid oxygen product 162 is then vaporized within heat exchanger 80 to form air gas product 42. The pressure and flow rate of air gas product 42 can be measured via second pressure sensor PI2 and FI1, respectively. As in FIG. 1, air gas product 42 flows across product control valve 50 and into air gas pipeline 60.

As noted previously, the pressure of air gas pipeline 60 tends to drift over time. In methods known heretofore, this problem was solved by adjusting the openness of product control valve 50 to create the appropriate pressure drop. However, there are inefficiencies in doing this. Instead, embodiments of the present invention can adjust the pressure set points within the cold box, for example, the discharge pressure of liquid oxygen pump 160. By reducing this pressure an appropriate amount, product control valve 50 can be left fully open, thereby resulting in minimal expansion losses across product control valve 50. In one embodiment, the appropriate amount yields a difference between PI2 and PI3 to be less than 5 psi, preferably less than 3 psi.

In another embodiment, by changing the pressure of liquid oxygen product 162, its vaporization temperature will also change. Furthermore, it is preferred that liquid oxygen product 162 vaporizes against a condensing air stream (e.g., boosted air stream 32). As such, in a preferred embodiment, the discharge pressure of booster air compressor 30 is also changed an appropriate amount. In one embodiment, an appropriate amount is preferably the amount that results in improved heating curves between liquid oxygen product 162 and boosted air stream 32.

In an embodiment in which the air gas product is nitrogen, the embodiment may include withdrawing higher pressure nitrogen product 129 as a liquid from higher pressure column 120, and pressurizing it to an appropriate pressure using a liquid nitrogen pump (not shown) before warming in heat exchanger 80. The resultant warmed nitrogen gas product would then be introduced to a nitrogen pipeline in similar manner as described with respect to the gaseous oxygen product. Alternatively, a liquid nitrogen stream can be removed from the lower pressure column instead of the higher pressure column.

Figure 3:
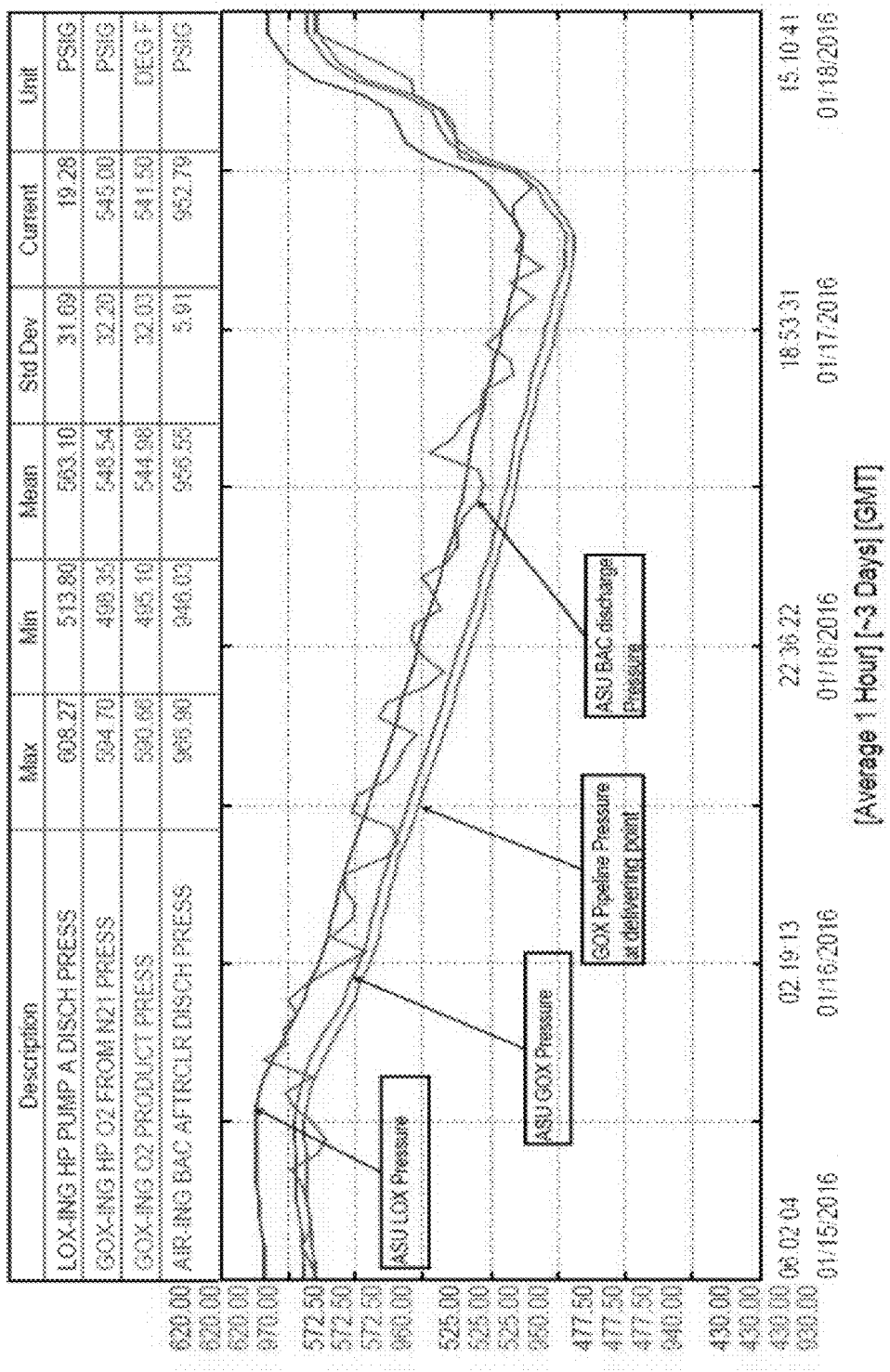
FIG. 3 provides a graphical representation of data for an embodiment of the present invention operating in a variable energy mode.

FIG. 3 provides a graphical representation of pressures as a function of time for an embodiment of the present invention. As can be seen from FIG. 3, the ASU GOX pressure is kept slightly above (e.g., between 3-4 psi) the GOX pipeline pressure. This is accomplished by altering both the LOX discharge pressure from the LOX pump, as well as altering the booster air compressor (BAC) discharge pressure. By operating the LOX pump and BAC in variable pressure mode, embodiments of the present invention are able to save on power consumption without any losses in flow rate production, and therefore, present an incredible advantage over the methods known heretofore.

Table I and Table II below, show comparative data of the various streams for oxygen production at 610 psig and 400 psig.

TABLE I 610 psig GOX

| Stream # | Flow (kscfh) | Pressure (psig) | Temp (° F.) |
|---|---|---|---|
| 2 | 7430 | 0 | 72 |
| 12 | 7430 | 71 | 87 |
| 24 | 3200 | 69 | 64 |
| 26 | 4143 | 69 | 64 |
| 32 | 2188 | 966 | 87 |
| 37 | 1012 | 525 | 87 |
| 42 | 1413 | 615 | 69 |
| 72 | 1012 | 794 | 87 |
| 92 | 1012 | 66 | −280 |
| 94 | 5155 | 66 | −260.5 |
| 162 | 1413 | 620 | −287 |
| MP Col | — | 66 | — |
| LP Col | — | 6 | — |

TABLE II 400 psig GOX

| Stream # | Flow (kscfh) | Pressure (psig) | Temp (° F.) |
|---|---|---|---|
| 2 | 7430 | 0 | 72 |
| 12 | 7430 | 71 | 87 |
| 24 | 3200 | 69 | 64 |
| 26 | 4143 | 69 | 64 |
| 32 | 2188 | 929 | 87 |
| 37 | 1012 | 513 | 87 |
| 42 | 1413 | 405 | 71 |
| 72 | 1012 | 794 | 87 |
| 92 | 1012 | 66 | −280 |
| 94 | 5155 | 66 | −266.5 |
| 162 | 1413 | 409 | −289 |
| MP Col | — | 66 | — |
| LP Col | — | 6 | — |

As is shown in the tables above, when the pipeline pressure changes, the pressures of streams 32, 37, 42 and 162 can be adjusted, while maintaining all other conditions substantially the same. As will be readily appreciated, being able to reduce compression needs for the LOX pump 160 and BAC 30 can result in significant power savings. Furthermore, this is accomplished without any loss of production in terms of flow rate and without any significant upset to the operating conditions of the double column.

Figure 4:
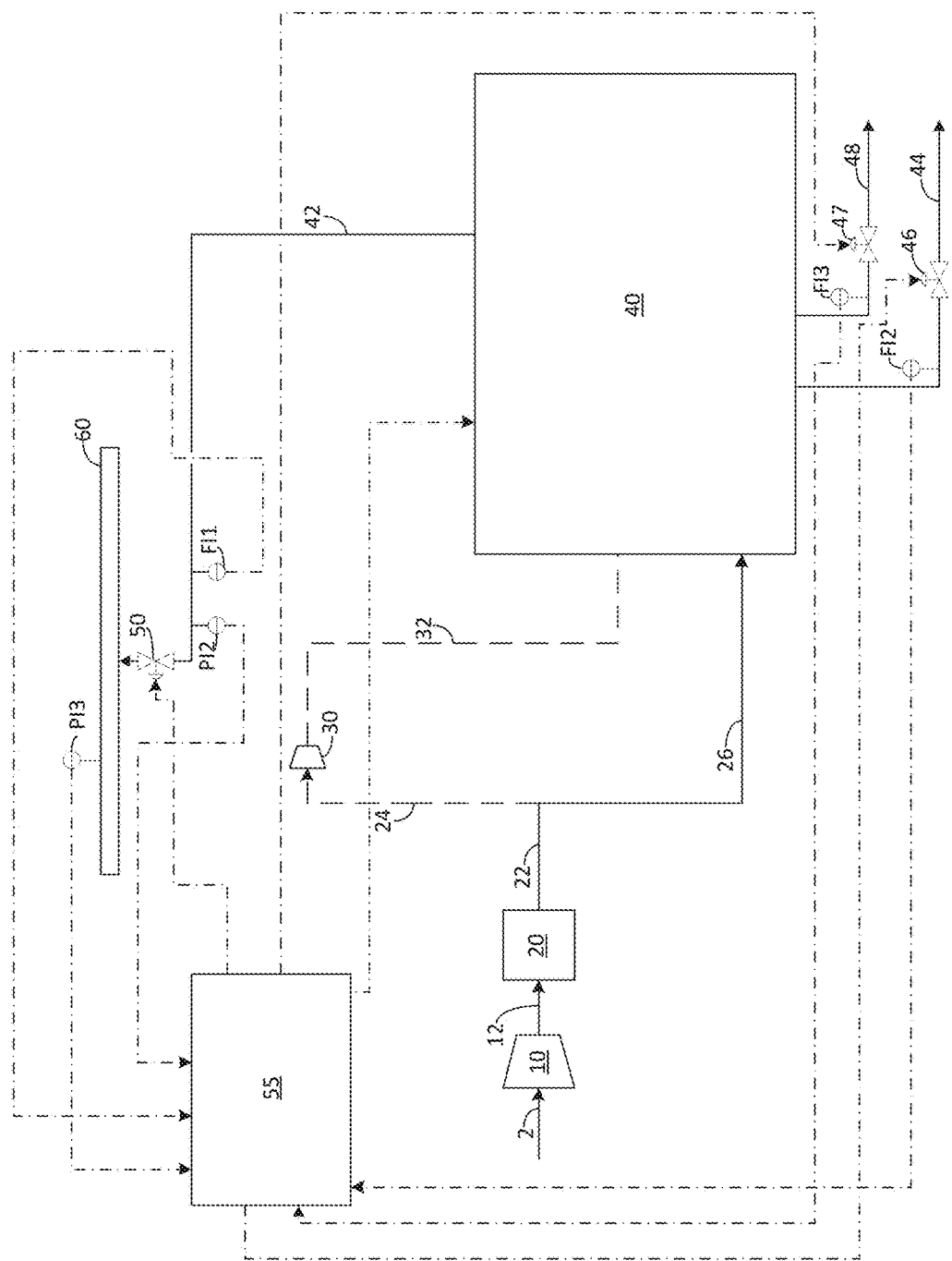
FIG. 4 provides an embodiment of the present invention operating in a variable liquid mode.

Now turning to FIG. 4, which represents an embodiment operating in a variable liquid mode. Air 2 is introduced into main air compressor 10 and compressed, preferably to a pressure of at least 55 psig to 75 psig (or around 5 psig higher than the pressure of the MP column). In an embodiment without booster air compressor 30, the pressure coming out of MAC 10 is preferably 400-450 psig. The resulting compressed humid air stream 12 is then purified of water and $CO_2$ in front end purification system 20, thereby producing dry air stream 22. In one embodiment, all of dry air stream 22 passes via line 26 into cold box 40. Within cold box 40, the air is cooled and cryogenically treated in order to separate the air into air gas product 42. Air gas product 42 is then removed from cold box 40 and passed through product control valve 50 before entering air gas pipeline 60.

In a preferred embodiment, the pressure and flow rate of air gas product 42 can be measured by second pressure indicator PI2 and flow indicator FI1, respectively. The pressure of air gas pipeline 60 can be measured by pressure indicator PI3. First liquid air gas product 44 and/or second liquid air gas product 48 can also be removed from cold box 40 in certain modes of operation. The flow rate of first liquid air gas product 44 can be measured by flow indicator FI2, and the flow rate of second liquid air gas product 48 can be measured by flow indicator FI3. In the embodiment shown, control valves 46, 47 can be used to control the flow rates of fluids 44, 48.

In one embodiment, the various pressure and flow indicators/sensors are configured to communicate (e.g., wirelessly or wired communication) with process controller 55, such that the various flow rates and pressures can be monitored by process controller 55, which is configured to adjust various settings throughout the process based on the measured flows and pressures.

Additionally, an embodiment of the present invention may also include booster air compressor 30. This embodiment is represented by dashed lines, since it is an optional embodiment. In this embodiment, a portion of dry air stream 22 is sent to booster air compressor 30 via line 24 and further compressed to form boosted air stream 32 before being introduced to cold box 40. While the embodiment of FIG. 4 shows booster air compressor 30 as a single compressor, those of ordinary skill in the art will recognize that booster air compressor 30 can be more than one physical compressor. Additionally, booster air compressor 30 can also be a multi-stage compressor.

While the figures show direct lines of communication from the various pressure and flow indicators to the process controller 55, embodiments of the invention should not be so limited. Rather, those of ordinary skill in the art will recognize that embodiments of the invention may include instances in which certain indicators communicate directly with a related pressure controller.

Figure 5:
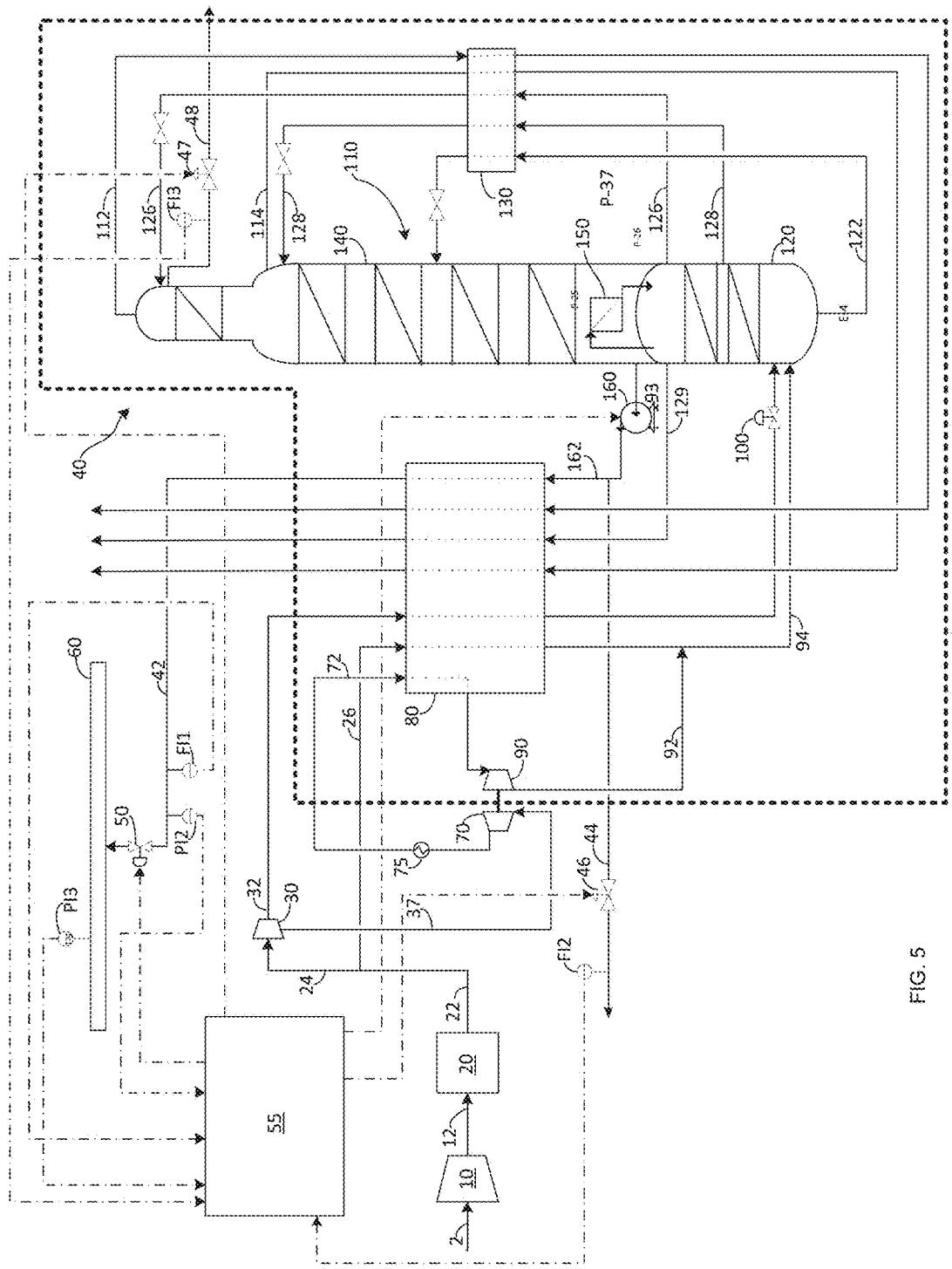
FIG. 5 provides another embodiment of the present invention operating in a variable liquid mode FIG. 6 provides a graphical representation of simulation data showing increases in liquid production as a function of gaseous oxygen product pressure for an embodiment operating in a variable liquid mode.

FIG. 5 provides a more detailed view of cold box 40 for the optional embodiment that includes booster air compressor 30. In this embodiment, cold box 40 also includes heat exchanger 80, turbine 90, valve 100, double column 110, higher pressure column 120, auxiliary heat exchanger 130, lower pressure column 140, condenser/reboiler 150, and liquid oxygen pump 160. Turbine 90 can be attached to booster 70 via a common shaft. Just like in FIG. 4, air 2 is introduced into main air compressor 10 and compressed, preferably to a pressure of at least 55 psig to 75 psig (or around 5 psig higher than the pressure of the MP column). The resulting compressed humid air stream 12 is then purified of water and $CO_2$ in front end purification system 20, thereby producing dry air stream 22. A first portion of dry air stream 24 is sent to booster air compressor 30, with the remaining portion of dry air stream 26 entering cold box 40, wherein it is fully cooled in heat exchanger 80 before being introduced to higher pressure column 120 for separation therein. Following pressurization in booster air compressor 30, boosted air stream 32 is preferably fully cooled in heat exchanger 80 and then expanded across valve 100, before being introduced into a bottom portion of higher pressure column 120.

Partially boosted air stream 37 is preferably removed from an inner stage of booster air compressor 30 before being further compressed in booster 70 and then cooled in after cooler 75 to form second boosted stream 72. Second boosted stream 72 undergoes partial cooling in heat exchanger 80, wherein it is withdrawn from an intermediate section of heat exchanger 80 and then expanded in turbine 90 thereby forming expanded air stream 92, which can then be combined with second portion of dry air stream 26 before introduction to higher pressure column 120.

Higher pressure column 120 is configured to allow for rectification of air within, thereby producing an oxygen-rich liquid at the bottom and a nitrogen-rich gaseous stream at the top. Oxygen-rich liquid 122 is withdrawn from the bottom of higher pressure column 120 before exchanging heat with low pressure waste nitrogen 114 and low pressure nitrogen product 112 in auxiliary heat exchanger 130, and then expanded across a valve and introduced into lower pressure column 140. As is well known in the art, higher pressure column 120 and lower pressure column 140 are part of double column 110, and the two columns are thermally coupled via condenser/reboiler 150, which condenses rising nitrogen rich gas from higher pressure column 120 and vaporizes liquid oxygen that has collected at the bottom of lower pressure column 140. In the embodiment shown, two nitrogen-rich gas streams 126, 128 are withdrawn from higher pressure column 120, exchange heat with low pressure nitrogen product 112 and low pressure waste nitrogen 114, subsequently expanded across their respective valves, and then introduced into lower pressure column 140. Medium pressure nitrogen product 129 can also be withdrawn from higher pressure column 120 and then warmed in heat exchanger 80.

Liquid oxygen collects at the bottom of lower pressure column 140 and is withdrawn and pressurized to an appropriate pressure by liquid oxygen pump 160 to form liquid oxygen 162. Liquid oxygen 162 is then vaporized within heat exchanger 80 to form air gas product 42. The pressure and flow rate of air gas product 42 can be measured via second pressure sensor PI2 and FI1, respectively. As in FIG. 4, air gas product 42 flows across product control valve 50 and into air gas pipeline 60. Liquid oxygen product 44 from liquid oxygen pump 160 is delivered to the storage (not shown). Liquid nitrogen product 48 from top of lower pressure column 140 is delivered to the storage (not shown).

As noted previously, the pressure of air gas pipeline 60 tends to drift over time. In methods known heretofore, this problem was solved by adjusting the openness of product control valve 50 to create the appropriate pressure drop. However, there are inefficiencies in doing this. Instead, embodiments of the present invention can adjust the pressure set points within the cold box, for example, the discharge pressure of liquid oxygen pump 160. By reducing this pressure an appropriate amount, product control valve 50 can be left fully open, thereby resulting in minimal expansion losses across product control valve 50. In one embodiment, the appropriate amount yields a difference between PI2 and PI3 to be less than 5 psi, preferably less than 3 psi.

By reducing the pressure of liquid oxygen product 162 and keeping the pressure of the incoming air streams at the same pressure set points (e.g., BAC and MAC maintained at constant set points), additional liquid production can be achieved. For example, for an ASU process that is built to produce gaseous oxygen at 610 psig (e.g., stream 42), approximately 51 kscfh LOX and 91 kscfh LIN can be produced. However, this same process can produce approximately 57 kscfh more LIN or 54 kscfh more LOX if the discharge pressure of the LOX pump is reduced to produce a gaseous oxygen product stream at approximately 400 psig.

Tables IV-VI below show comparative data for various streams with Table IV being a base case at 610 psig GOX production, Table V being an embodiment in which LIN production was maximized with GOX production being at 400 psig, and Table VI being an embodiment in which LOX production was maximized with GOX production also being at 400 psig. While these examples only show LIN and LOX production being maximized, respectively, those of ordinary skill in the art will recognize that embodiments of the invention are not so limited. Rather, embodiments of the invention can also include instances in which both LOX and LIN production could be both increased at the same time. Those of ordinary skill in the art will recognize that in these embodiments, the increase for each LIN or LOX will not be as much individually as is shown in Table V or Table VI.

TABLE IV

| | 610 psig GOX | | |
| --- | --- | --- | --- |
| Stream # | Flow (kscfh) | Pressure (psig) | Temperature (° F.) |
| 2 | 8073 | 0 | 72 |
| 12 | 8073 | 71 | 87 |
| 24 | 4010 | 69 | 64 |
| 26 | 3329 | 69 | 64 |
| 32 | 2663 | 928 | 87 |

TABLE IV-continued 610 psig GOX

| Stream # | Flow (kscfh) | Pressure (psig) | Temperature (° F.) |
|---|---|---|---|
| 37 | 1347 | 515 | 87 |
| 42 | 1487 | 610 | 74 |
| 44 | 51 | 30 | −297 |
| 48 | 91 | 6 | −315 |
| 72 | 1347 | 790 | 87 |
| 92 | 1347 | 66 | −281 |
| 94 | 4676 | 66 | −248 |
| 162 | 1487 | 614 | −287 |
| MP Col | — | 66 | — |
| LP Col | — | 6 | — |

TABLE V 400 psig GOX - LIN Production

| Stream # | Flow (kscfh) | Pressure (psig) | Temperature (° F.) |
|---|---|---|---|
| 2 | 8073 | 0 | 72 |
| 12 | 8073 | 71 | 87 |
| 24 | 4010 | 69 | 64 |
| 26 | 3329 | 69 | 64 |
| 32 | 2663 | 928 | 87 |
| 37 | 1347 | 515 | 87 |
| 42 | 1487 | 400 | 75 |
| 44 | 51 | 30 | −297 |
| 48 | 148 | 6 | −315 |
| 72 | 1347 | 826 | 87 |
| 92 | 1347 | 66 | −281 |
| 94 | 4676 | 66 | −252 |
| 162 | 1487 | 404 | −289 |
| MP Col | — | 66 | — |
| LP Col | — | 6 | — |

TABLE VI 400 psig GOX - LOX Production

| Stream # | Flow (kscfh) | Pressure (psig) | Temperature (° F.) |
|---|---|---|---|
| 2 | 8073 | 0 | 72 |
| 12 | 8073 | 71 | 87 |
| 24 | 4010 | 69 | 64 |
| 26 | 3329 | 69 | 64 |
| 32 | 2663 | 928 | 87 |
| 37 | 1347 | 515 | 87 |
| 42 | 1433 | 400 | 75 |
| 44 | 105 | 30 | −297 |
| 48 | 91 | 6 | −315 |
| 72 | 1347 | 826 | 87 |
| 92 | 1347 | 66 | −281 |
| 94 | 4676 | 66 | −248 |
| 162 | 1433 | 404 | −289 |
| MP Col | — | 66 | — |
| LP Col | — | 6 | — |

As is shown in the tables above, when the pipeline pressure changes, the pressure of stream 42 is adjusted to match the pipeline pressure and the flow rates of streams 44 or 48 are changed. The remaining streams remain largely unchanged. As will be readily appreciated, being able to produce additional amounts of liquid can be highly beneficial, particularly since liquid streams are at a premium on the market. Furthermore, this is accomplished without any loss of production in terms of flow rate, without any significant upset to the operating conditions of the double column, and with minimal additional capital expenses.

In an embodiment in which the air gas product is nitrogen, the embodiment may include withdrawing higher pressure nitrogen product 129 as a liquid from higher pressure column 120, and pressurizing it to an appropriate pressure using a liquid nitrogen pump (not shown) before warming in heat exchanger 80. The resultant warmed nitrogen gas product would then be introduced to a nitrogen pipeline in similar manner as described with respect to the gaseous oxygen product. Alternatively, a liquid nitrogen stream can be removed from the lower pressure column instead of the higher pressure column.

Figure 6:
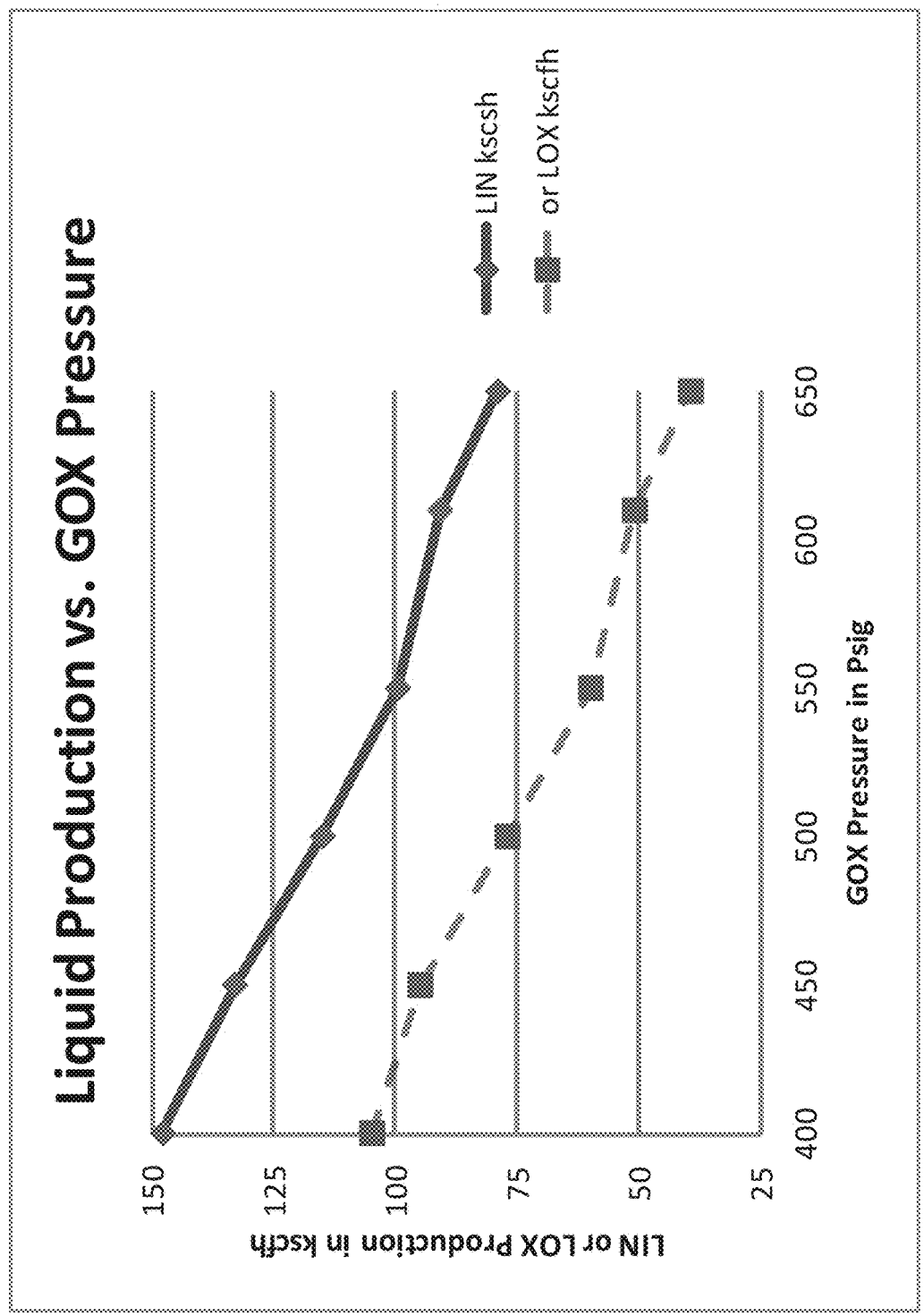

FIG. 6 presents a graphical representation of liquid production as a function of pressure of the air gas product (e.g., stream 42). As shown in the example, going from a pressure of about 650 psig to 400 psig can yield an almost two fold increase in LIN production (went from about 80 to about 150 kscfh). Similarly, liquid oxygen production was increased from around 40 to about 105 kscfh. While the graphical representation was developed with the assumption that only one of the liquid products was being adjusted at a time, the invention is not intended to be so limited. In fact, it is perfectly acceptable to increase both liquid products at the same time.

In another embodiment, process controller 55 can be configured to access spot pricing data (or the user can input data into the controller), such that process controller 55 can be configured to optimize/adjust the amount of increased LIN and/or LOX based upon the current spot pricing data. Similarly, process controller 55 can also be configured to keep track of local inventories of LIN and/or LOX, and make adjustments to the production of LIN and/or LOX based on this additional data.

In another embodiment, process controller 55 can determine whether to operate in power savings mode or additional liquid production mode based upon certain conditions. For example, if electricity is cheaper than normal, saving power might not be of great importance, and therefore, process controller 55 can make a determination to switch to liquid production mode. In a preferred embodiment, process controller 55 makes these decisions automatically based on input conditions. In another embodiment, process controller 55 can include a manual override.

The terms "nitrogen-rich" and "oxygen-rich" will be understood by those skilled in the art to be in reference to the composition of air. As such, nitrogen-rich encompasses a fluid having a nitrogen content greater than that of air. Similarly, oxygen-rich encompasses a fluid having an oxygen content greater than that of air.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

We claim:

1. An apparatus for the production of air gases by the cryogenic separation of air, the apparatus comprising:
    a) a main air compressor configured to compress air to a pressure suitable for the cryogenic rectification of air to produce a compressed humid air stream, the compressed humid air stream having a first pressure $P_o$;
    b) a front end purification system configured to purify the compressed humid air stream of water and carbon dioxide to produce a dry air stream having reduced amounts of water and carbon dioxide as compared to the compressed humid air stream;
    c) a booster compressor in fluid communication with the front end purification system, wherein the booster compressor is configured to compress a first portion of the dry air stream to form a boosted air stream, the boosted air stream having a first boosted pressure $P_{B1}$;
    d) a cold box comprising a main heat exchanger, a system of columns having a double column comprised of a lower pressure column and a higher pressure column, a condenser disposed at a bottom portion of the lower pressure column, and a liquid oxygen pump, wherein the cold box is configured to receive the boosted air stream and a second portion of the dry air stream under conditions effective to separate air to form an air gas product, wherein the air gas product is selected from the group consisting of oxygen, nitrogen, and combinations thereof;
    e) means for monitoring the pressure of a pipeline, wherein the pipeline is in fluid communication with the cold box, such that the pipeline is configured to receive the air gas product from the cold box, the air gas product having a first product pressure $P_{P1}$; and
    f) a process controller configured to adjust one or more pressure set points of the apparatus based on the monitored pipeline pressure, wherein the one or more pressure set points of the apparatus is selected from the group consisting of a discharge pressure of the booster air compressor, a discharge pressure of the main air compressor, and combinations thereof;
    wherein the process controller is further configured to adjust liquid production from the cold box; and
    wherein the process controller is further configured to choose between a first mode of operation and a second mode of operation, wherein the first mode of operation results in a power savings, wherein the second mode of operation results in increased liquid production.

2. The apparatus as claimed in claim 1, wherein the process controller is further configured to access process conditions selected from the group consisting of spot pricing data for electricity, local liquid inventories, and combinations thereof.

3. The apparatus as claimed in claim 1, wherein during the second mode of operation, the process controller is configured maintain the first boosted pressure $P_{B1}$ substantially constant while adjusting the discharge pressure of the liquid oxygen pump.

4. The apparatus as claimed in claim 1, wherein during periods of time in which the process controller chooses the second mode of operation, the first boosted pressure $P_{B1}$ is kept substantially constant.

5. An apparatus for the production of air gases by the cryogenic separation of air, the apparatus comprising:
    a cold box configured to receive a purified and compressed air stream under conditions effective for cryogenically separating the air stream to form an air gas product using a system of columns, wherein the purified and compressed air stream is at a feed pressure $P_F$ when entering the cold box, wherein the air gas product is selected from the group consisting of oxygen, nitrogen, and combinations thereof, wherein the cold box is configured to produce the air gas product at a product pressure $P_{PO}$, wherein the cold box is in fluid communication with an air gas pipeline, such that the apparatus, during operation, is configured to send an air gas product from the cold box to the air gas pipeline, wherein the system of columns comprises a double column comprised of a lower pressure column and a higher pressure column, wherein the cold box further comprises a main heat exchanger, a condenser disposed at a bottom portion of the lower pressure column, and a liquid oxygen pump configured to receive liquid oxygen from the system of columns and introduce the liquid oxygen to a cold end of the main heat exchanger;
    a main air compressor disposed upstream the cold box;
    a booster air compressor downstream the main air compressor and upstream the cold box;
    a pressure monitoring device configured to monitor the pipeline pressure $P_{PL}$; and
    a controller configured to operate the apparatus in a first mode of operation and a second mode of operation, wherein the controller is further configured to adjust one or more pressure set points of the apparatus based on the monitored pipeline pressure, wherein the one or more pressure set points of the apparatus is selected from the group consisting of a discharge pressure of the booster air compressor, a discharge pressure of the main air compressor, a discharge pressure of the liquid oxygen pump, and combinations thereof,
    wherein the controller is further configured to receive liquid product data, wherein the liquid product data comprises spot pricing data for liquid oxygen,
    wherein during the first mode of operation, the controller is further configured to reduce the difference between the pipeline pressure $P_{PL}$ and the discharge pressure of the liquid oxygen pump,
    wherein during the second mode of operation, the controller is further configured to reduce the difference between the pipeline pressure $P_{PL}$ and the delivery pressure $P_{DO}$; and adjust liquid production from the cold box.

6. The apparatus as claimed in claim 5, wherein the controller reduces the difference between the pipeline pressure $P_{PL}$ and the discharge pressure of the liquid oxygen pump by adjusting the discharge pressure of the liquid oxygen pump.

7. The apparatus as claimed in claim 5, wherein the controller, during the second mode of operation, is configured to adjust the liquid production from the cold box while maintaining the feed pressure $P_F$ substantially constant.

8. The apparatus as claimed in claim 5, wherein the product pressure $P_{PO}$ and the discharge pressure of the liquid oxygen pump are substantially the same.

9. The apparatus as claimed in claim 5, wherein the controller is in communication with the pressure monitoring device.

10. The apparatus as claimed in claim 5, comprising an absence of a GOX feed valve configured to reduce the difference between the pipeline pressure $P_{PL}$ and the delivery pressure $P^{DO}$.

11. The apparatus as claimed in claim 5, further comprising a gaseous oxygen (GOX) feed valve, wherein the GOX feed valve is in fluid communication with an outlet of the liquid oxygen pump and an inlet of the air gas pipeline, wherein the GOX feed valve is maintained in a fully open position during operation in both the first mode and second mode.

12. The apparatus as claimed in claim 5, wherein during the first mode of operation, the controller is further configured to adjust the discharge pressure of the main air compressor.

13. The apparatus as claimed in claim 5, wherein during the first mode of operation, the controller is further configured to adjust the discharge pressure of the booster compressor.

* * * * *